US010026164B2

(12) United States Patent
Keitler et al.

(10) Patent No.: US 10,026,164 B2
(45) Date of Patent: Jul. 17, 2018

(54) METHOD OF PERFORMING AND MONITORING A PROCESSING STEP ON A WORKPIECE

(71) Applicant: EXTEND3D GmbH, Munich (DE)

(72) Inventors: Peter Keitler, Munich (DE); Nicolas Heuser, Munich (DE); Bjoern Schwerdtfeger, Munich (DE); Christoph Resch, Garching bei Munich (DE)

(73) Assignee: EXTEND3D GmbH (DE)

( * ) Notice: Subject to any disclaimer, the term of this patent is extended or adjusted under 35 U.S.C. 154(b) by 133 days.

(21) Appl. No.: 15/105,719

(22) PCT Filed: Dec. 12, 2014

(86) PCT No.: PCT/EP2014/077634
§ 371 (c)(1),
(2) Date: Jun. 17, 2016

(87) PCT Pub. No.: WO2015/091291
PCT Pub. Date: Jun. 25, 2015

(65) Prior Publication Data
US 2016/0343125 A1 Nov. 24, 2016

(30) Foreign Application Priority Data

Dec. 20, 2013 (DE) .................. 10 2013 114 707

(51) Int. Cl.
G06K 9/00 (2006.01)
G06T 7/00 (2017.01)
G01B 11/25 (2006.01)
G01C 11/02 (2006.01)
G06K 9/46 (2006.01)
H04N 13/02 (2006.01)
G06T 7/73 (2017.01)
G06T 7/514 (2017.01)

(52) U.S. Cl.
CPC ........ *G06T 7/0006* (2013.01); *G01B 11/2513* (2013.01); *G01C 11/025* (2013.01);
(Continued)

(58) Field of Classification Search
CPC ........ G06K 9/4671; G06T 2207/10028; G06T 2207/30164; G06T 2207/30204;
(Continued)

(56) References Cited

U.S. PATENT DOCUMENTS

2005/0121422 A1* 6/2005 Morden .................. B25H 7/00
219/121.6
2008/0246943 A1 10/2008 Kaufman et al.
(Continued)

FOREIGN PATENT DOCUMENTS

EP 2642246 4/2013
EP 2590040 8/2013
(Continued)

OTHER PUBLICATIONS

Worker Assistance and Quality Inspection—Application of Optical 3D Metrology and Augmented Reality Technologies, Sauer, et al., IMEKO TC1 Symposium, Aug. 31-Sep. 2, 2011.
(Continued)

*Primary Examiner* — Phuoc Tran
(74) *Attorney, Agent, or Firm* — Carlson, Gaskey & Olds, P.C.

(57) ABSTRACT

A method of performing and monitoring a processing step on a workpiece using a system having a projector, a photogrammetric device and a control unit knowing the relative position of the projector and the photogrammetric device, comprises the following steps: referencing to determine a pose of the workpiece with respect to the projector and the photogrammetric device in a predetermined coordinate system; projection of a work instruction onto the workpiece; processing of the workpiece by a worker; and monitoring of the processing by scanning at least a portion of a surface of the workpiece, wherein all steps, with the exception of the processing by the worker, are performed by the device and wherein all steps are performed at the same workstation within a framework of an integrated process.

22 Claims, 5 Drawing Sheets

(52) U.S. Cl.
 CPC ............ *G06K 9/4671* (2013.01); *G06T 7/514* (2017.01); *G06T 7/75* (2017.01); *H04N 13/0246* (2013.01); *G06T 2207/10028* (2013.01); *G06T 2207/30164* (2013.01); *G06T 2207/30204* (2013.01); *G06T 2207/30244* (2013.01)

(58) Field of Classification Search
 CPC ......... G06T 2207/30244; G06T 7/0006; G06T 7/514; G06T 7/75; H04N 13/0246
 See application file for complete search history.

(56) References Cited

U.S. PATENT DOCUMENTS

| | | | |
|---|---|---|---|
| 2010/0141946 A1 | 6/2010 | Johannesson et al. | |
| 2014/0267619 A1* | 9/2014 | Bridges | G01S 17/003 348/46 |

FOREIGN PATENT DOCUMENTS

| | | |
|---|---|---|
| WO | 2007038740 | 4/2007 |
| WO | 2012136345 | 10/2012 |

OTHER PUBLICATIONS

English language translation of essential parts of office action in DE counterpart application dated Aug. 24, 2014.

International Search Report and Written Opinion of International Application No. PCT/EP2014/077634 dated Mar. 19, 2015.

Translation of International Preliminary Report on Patentability of International Application No. PCT/EP2014/077634 dated Jun. 21, 2016.

* cited by examiner

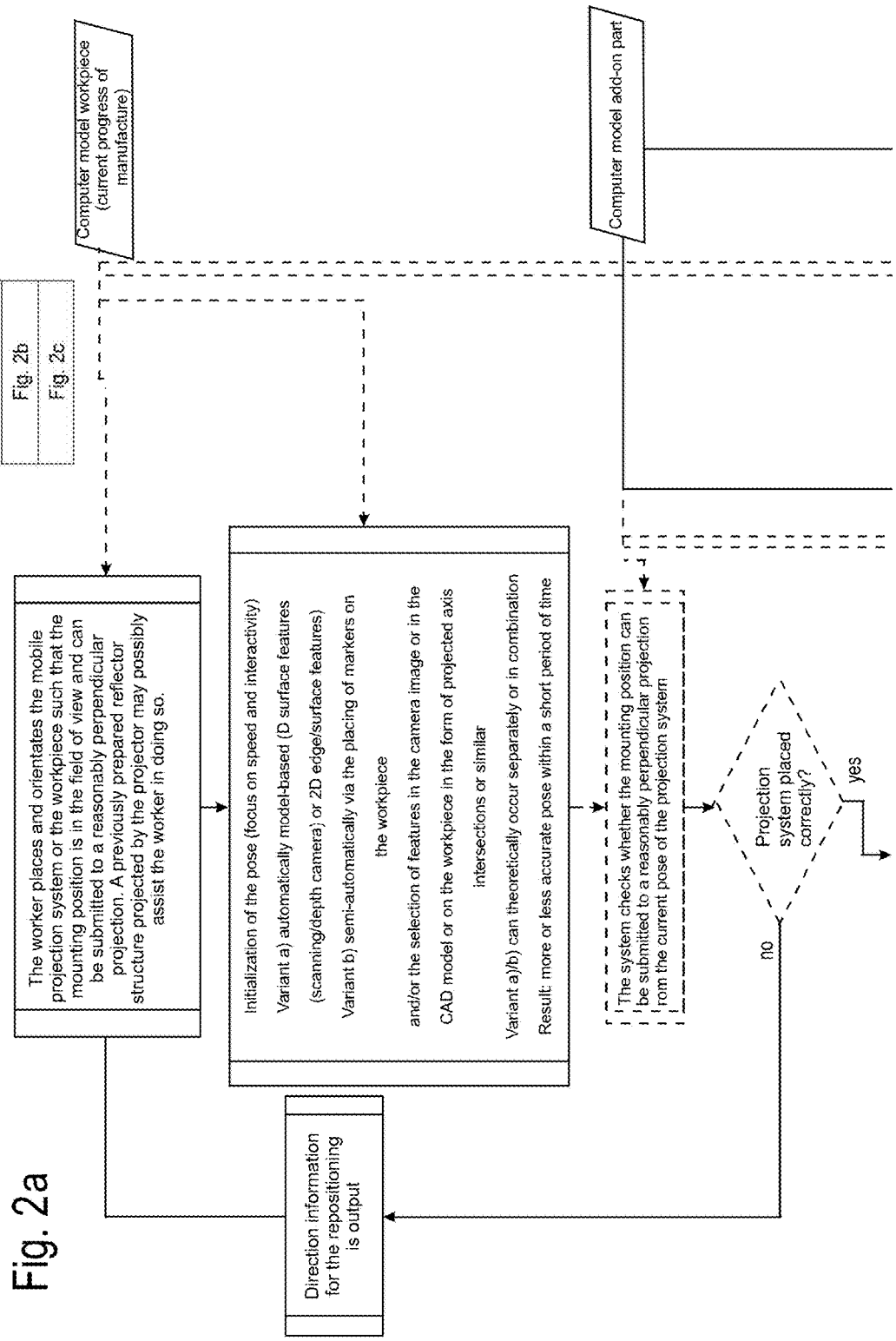

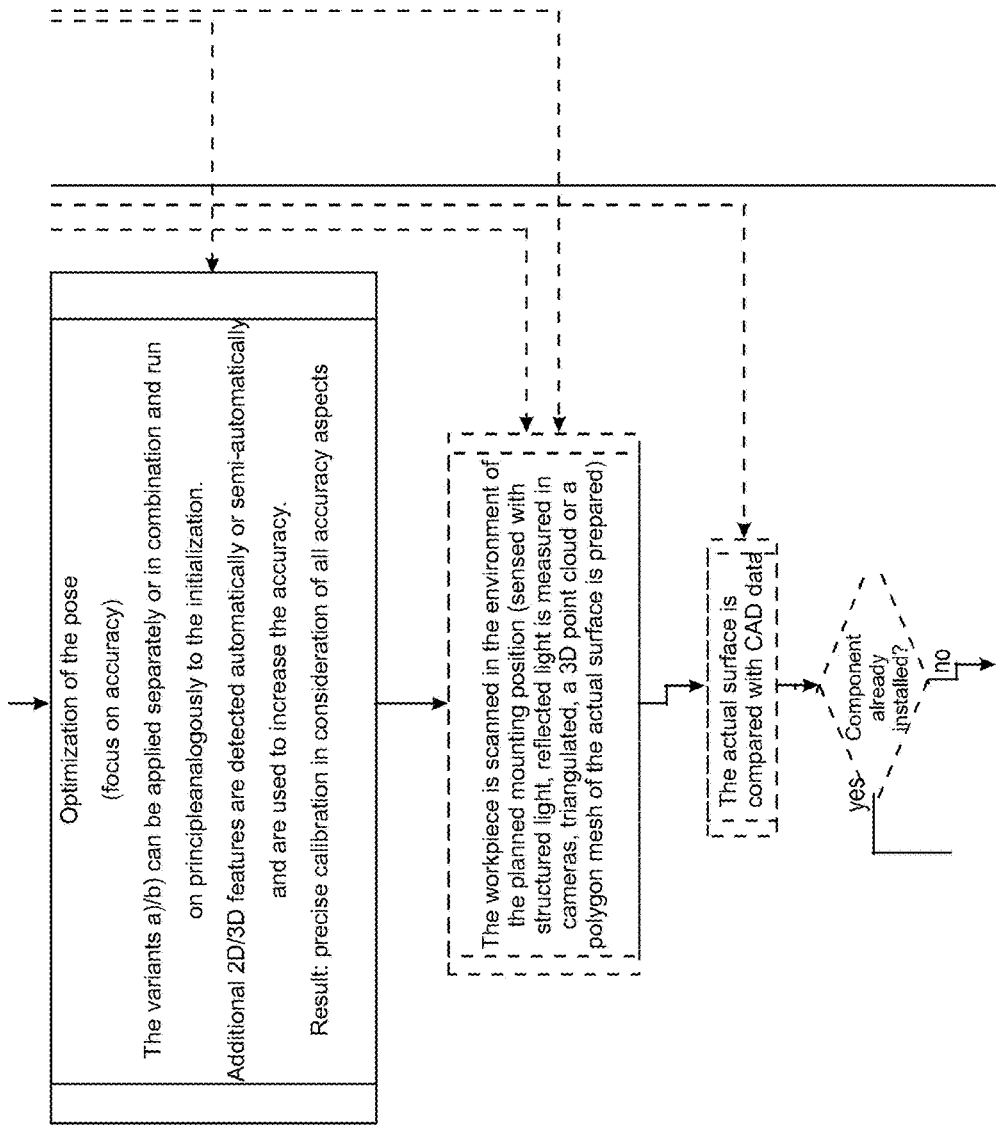

METHOD OF PERFORMING AND MONITORING A PROCESSING STEP ON A WORKPIECE

RELATED APPLICATION

This application is the U.S. national phase of PCT/EP2014/077634, filed Dec. 12, 2014, claiming priority to DE 10 2013 114 707.0, filed Dec. 20, 2013.

TECHNICAL FIELD

The invention relates to a method of performing and monitoring a processing step on a workpiece.

BACKGROUND

Document WO 2012/136345 A2 discloses a system and a method for the visual representation of information on real objects. A projection unit transmits graphical or pictorial information on an object, whereas a dynamic tracker determines and tracks the position and/or the location of the object and/or the projection unit in space using a 3D-sensing system. A control correspondingly adapts the transmission of the piece of information to the current position, and/or location of the object or of the projection unit as determined by the tracker. To determine the pose of the object and to calibrate and/or track the projection unit and/or the object, it is possible to fasten markers at predetermined reference points, the reflected light of which is detected by the tracker. Alternatively, a stripe light scanning process may also be carried out in which the projection unit projects an image which is detected and then triangulated or reconstructed using one or several cameras. Points on the object are scanned in accordance with a predetermined system (scanning), and for the calculation of the pose of the object, an iterative best-fit strategy is used. Depending on the projection technique, stripes or other patterns (video projection) or also merely individual points or lines (laser projector) are here scanned over the entire surface.

Document EP 2 642 246 A2 describes a method by which template patterns can be accurately projected onto a workpiece, for example within the framework of the instruction of a fitter upon assembly of components. In this method, one or more precisely calibrated cameras are used for the direct detection of the position of the spot or pattern projected by a laser projector on the surface of the workpiece. Using photogrammetric analyzing techniques, the position of the projector with respect to the cameras is determined. To this end, the detection of features on the workpiece surface by the laser projector is provided, in particular using a mechanical sensing head. A corrected template pattern is then projected onto the workpiece on the basis of the calculated relative position of the workpiece and the projector.

If, for manufacturing reasons or other reasons, the actual surface of the workpiece does not match with that of the CAD model of the workpiece on which the control of the projection is based, document EP 2 642 247 A2 proposes a method by which the laser projection may be adapted accordingly. To this end, alignment features with an order of priority are defined on the workpiece, with which the projection is then aligned.

In addition to projection systems of this type, there are furthermore pure measurement systems by which the geometrical shape and the position and orientation of an object may be determined by an optical and/or mechanical sensing. Different measuring setups are employed in the industry depending on the size of the object. In case of small object sizes, stripe light scanners are often used, in particular mobile devices having an integrated projector and an integrated camera. For a digitalization of 360°, the object may possibly be placed onto a rotary table. Small objects may also be detected in scan chambers which are equipped with a photogrammetric device composed of several cameras and projectors or of one camera and one projector in connection with a rotating table for the object. The advantage of a chamber consists in the optimum conditions for photogrammetry (dark, no influences from the outside). Medium-sized objects are usually calibrated by using coordinate measuring devices which are typically permanently installed in a specific place. Laser scanners are used for large objects which, if necessary, have to be installed in different places within the framework of measuring to ensure a sufficient detection of the objects from several angles of view.

All these (also the mobile) measuring techniques have in common that they have to be carried out by skilled measuring technicians. Furthermore, the workpieces have to be brought to specific places for measuring in certain methods, which is connected with logistic difficulties and a considerable time delay.

The matching following the calibration within the framework of a desired target-actual comparison usually requires two stages: at first, an initialization is carried out to determine an approximate pose of the workpiece, before a nonlinear optimization is then realized. The initialization requires manual inputs into the used measuring technique software. Depending on the situation, one to three striking features (edges, planes, bores etc.) have to be identified in the on-screen display, for example by use of a mouse. In the subsequent nonlinear optimization, the so-called floating into position, the point cloud is displaced and rotated in small steps with respect to the CAD model, and the respective perpendicular distances from the surface are calculated. This is carried out in an iterative manner until the error sum of squares is minimal. A sufficiently good initialization is required for the optimization, such that the global minimum can be obtained (the algorithm would otherwise end in a local minimum, and the resulting matching would be incorrect).

After matching, a test report is prepared from the protocol of the deviations between the target and the actual state of the object. The test report is evaluated and, if necessary, is used on the spot to take countermeasures in case deviations are too large.

Such a "measuring" test of workpieces is realized only very selectively due to the described complexity. Merely highly critical aspects are checked in job lots, less critical aspects, however, are not checked at all. In the large-scale production, the checks are usually carried out only randomly, for example every $100^{th}$ piece.

Due to the delayed availability of the test report, high costs and losses of time may arise in either case. During the manual assembly, a standstill can be generated if the further mounting has to be interrupted due to quality difficulties until the test report is available on the basis of which the problems may be solved by a correction or a wrecking. In the series production, rejects are produced within the time period between the appearing of the problem and the availability of the test report. Valuable personal/machine capacities are therefore unnecessarily bound and resources wasted.

SUMMARY

The object of the invention is to further enhance the efficiency of processing steps in manufacture, assembly and maintenance and simultaneously to further increase the quality of work.

This object is achieved by a method of performing and monitoring a processing step on a workpiece having the features of claim 1. Advantageous and purposeful embodiments of the method according to the invention are given in the associated dependent claims.

The method according to the invention of performing and monitoring a processing step on a workpiece using a system having a projector, a photogrammetric device and a control unit which knows the relative position of the projector and the photogrammetric device comprises the following steps:
referencing for determining a pose of the workpiece with respect to the projector and the photogrammetric device in a predetermined coordinate system,
projection of a work instruction onto the workpiece,
processing of the workpiece by a worker, and
monitoring of the processing by scanning at least one portion of a surface of the workpiece.

According to the invention, all steps, with the exception of the processing by the worker, are performed by the system, and all steps are performed at the same workstation within the framework of an integrated process.

A processing step within the meaning of the invention may include any type of processing which modifies the outer shape of the workpiece, in particular a mounting or fastening of a component or a material removal. A work instruction may be any information useful for the worker which is connected with the current processing step. The term "scan" includes in connection with the invention the covering of the workpiece surface with points, lines or patterns projected onto the workpiece by the projector, with a simultaneous sensing of the reflections from the workpiece surface by the photogrammetric device.

The invention is based on the findings that when using an appropriate system, it is possible to combine advantageous principles of metrology with advantageous principles of projection such that all steps required for a successful processing of a workpiece may be carried out efficiently in one single integrated process, the worker being best possibly supported by the projection onto the workpiece. Since no different setups or workstations, and thus no spatial separation and time delays between the individual steps are necessary, the processing may be carried out in a very time and cost saving manner. Furthermore, the automatic optical monitoring of the workpiece processing as provided by the invention creates the possibility to recognize and correct errors as early as possible such that the process reliability is increased and rejects and unnecessary expenditure related therewith are avoided.

BRIEF DESCRIPTION OF THE DRAWINGS

Further universally applicable features and advantages of the invention result from the description below and from the accompanying drawings to which reference is made. The drawings show.

DETAILED DESCRIPTION

Figure 1A:
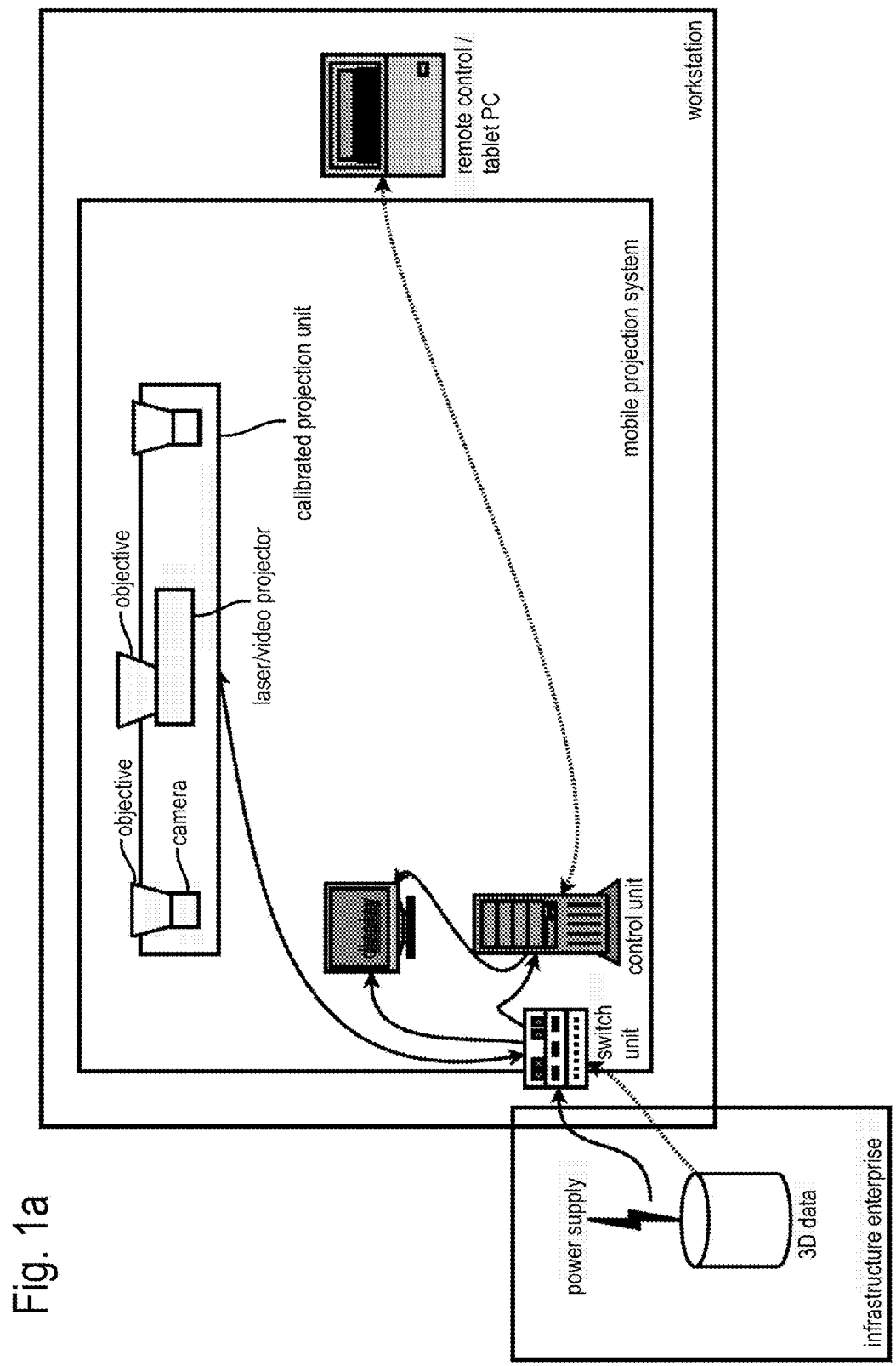
FIG. 1a a schematic representation of a device for performing and monitoring a processing step on a workpiece according to a first embodiment, FIG. 1b a schematic representation of a device for performing and monitoring a processing step on a workpiece according to a second embodiment, and FIG. 2 an exemplary flow chart for the method according to the invention wherein the complete flow chart is comprised of FIGS. 2A, 2B, and 2C.
Figure 1B:
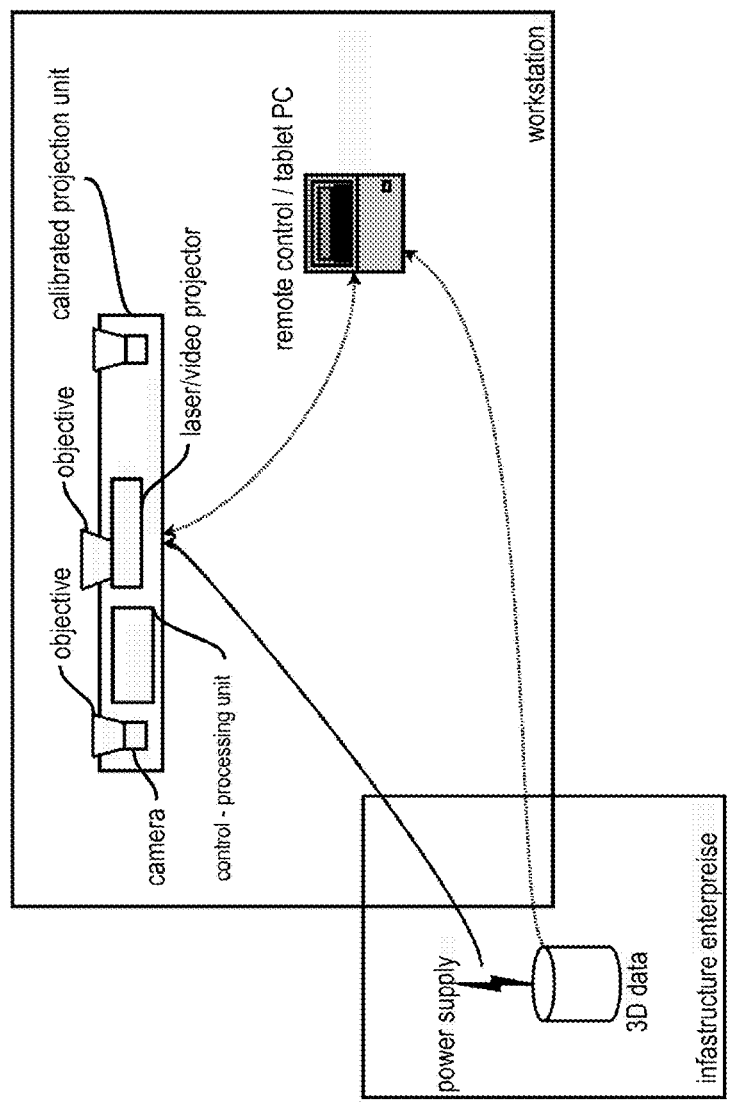

FIGS. 1a and 1b show different embodiments of a system by which an operator (worker) can carry out a method for performing and monitoring a processing step on a workpiece. As described in detail below, this system permits the realization of all required steps in one single integrated process combining metrology and assembling. A largely automated referencing (which is preferably repeated several times as a dynamic referencing during the process) is optionally followed by a check whether a processing step on the workpiece is required at all. Subsequently, after projecting a work instruction onto the workpiece, the manual processing of the workpiece by the worker is carried out, and it is then immediately automatically checked whether the processing step has been carried out correctly.

The device comprises as essential components a projector (laser projector, stripe light projector, beamer or similar) and a photogrammetric device having one or more cameras (here two for example) the pose of which with respect to the projector is known and is not modified during the execution of the method. As camera(s), conventional industrial cameras and depth cameras (so-called time-of-flight cameras) or also other depth sensors (for example Microsoft Kinect) come into consideration. The system furthermore includes a control unit which is also used for evaluation, and an optional remote control, for example in the form of a tablet PC for the control unit.

In the embodiment represented in FIG. 1a, the cameras and the projector are integrated into a mobile constructional unit. Here, a PC having a screen connected to the projector and to the photogrammetric device via a switching unit serves as a control unit. In contrast thereto, the control unit in the embodiment represented in FIG. 1b is integrated into the same mobile constructional unit as the projector and the camera. The mobile constructional unit may, for example, be mounted to a pivoting arm or may be placed along with at least part of the remaining components of the system and a distribution box on a mobile trolley or similar such that merely a power connection is required. The constructional unit may of course also be permanently mounted on a workstation.

A processing step to be performed on the workpiece is instructed and monitored by the system. This process is described by way of example with reference to the flow chart of FIG. 2. The flow chart represents with reference to a mounting example an integrated process which includes all essential but also some optional steps with respect to the invention.

Figure 2C:
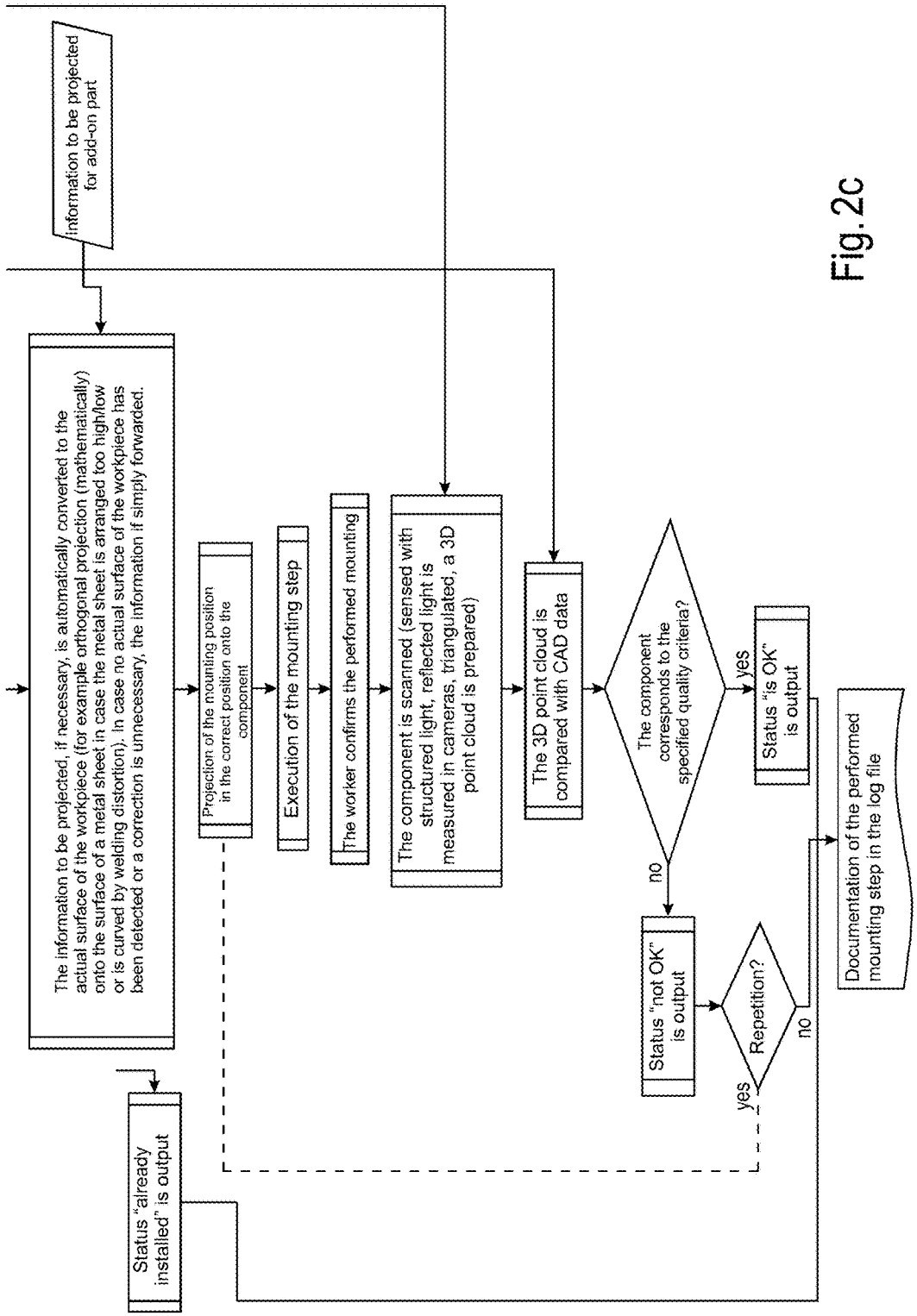

Therefore, the flow chart does not show how the processing step to be performed is selected by the worker; rather, it is assumed that the latter is previously known. Actually, more than one processing step must often be performed on a workpiece in sequence one after another. The worker can then, for example, manually switch further from one to another step by use of the remote control. FIG. 2 does not show, either, how the correct processing step or the correct sequence of processing steps is selected for a specific workpiece. This can, for example, also occur manually via a remote control on the basis of a list of pre-configured sequences.

In a particularly advantageous development of the method, encoded markers that are required for the (dynamic) referencing explained in detail further below are already fixed in a preceding process step in the form of adhesive labels or laser signatures, for example, directly to the workpiece or also to a fixture of the workpiece, such as a transport frame or trolley. The code of the marker(s) here replaces the conventional production sheet (by analogy with a bar code). The code of the marker may now be automatically recognized via the photogrammetric device, the workpiece being adapted to be identified and the processing step corresponding thereto or the sequence of processing steps being selected on the this basis. The operation of the system is thus further simplified, and input errors are avoided.

The course of an individual selected processing step is described below.

First, the system and the workpiece to be processed are placed by an operator (worker) with respect to each other such that the area of the workpiece in which the processing is to be performed, for example the welding of a support, lies in the field of view of the photogrammetric device and such that the projector can project, if possible, perpendicularly onto this region. A previously prepared diagram, or also a previously prepared reference outline projected by the projector, may here possibly assist the worker.

A referencing is performed prior to the processing of the workpiece, i.e. a spatial relationship between the workpiece, on the one hand, and the projector or the photogrammetric device, on the other hand, is established, which is expressed in a pose (six degrees of freedom, position and orientation of the projector with respect to the workpiece and vice versa, depending on the angle of view). In terms of process, the referencing is subdivided in two phases: 1) the initialization of the pose and 2) the optimization of the pose.

During initialization, the speed and interactivity are the center of attention. The aim is to determine an approximate pose as quickly as possible and preferably to a wide exclusion of user interaction. If necessary, the worker may thus be instructed very interactively how the workpiece or the projection unit is to be moved such that the next mounting step can be carried out. With regard to the optimization, the focus is however the accuracy. Very generally speaking, further information beneficial to the increase of accuracy is acquired. Though all information could also be acquired and evaluated in one single step, this would be unfavorable for the practical reasons explained further below (duration, degree of the user interaction).

FIG. 2 shows the initialization and the optimization in fixed places in the flow chart. In a particularly advantageous development of the method, the referencing is however also continuously repeated at later points in time in the flow chart with regard to a dynamic referencing (not shown in FIG. 2). Therefore, both the constructional unit with the projector and the photogrammetric device and the workpiece may be moved freely without the loss of the spatial relationship. In case of small movements, in particular after undesired shocks or bumps, a new execution of the optimization of the pose is sufficient. In case of larger movements, the initialization may possibly also have to be performed again.

Should the new execution of referencing of the projector be required (in particular for scanning), the projection shown at the moment must possibly be briefly interrupted to this end. In a particularly advantageous development of the method, the shown projection can be closely interlaced in time with the representation required for the scanning such that the perception of the worker is not disturbed at all or only slightly. In a video projector, for example, merely every $n^{th}$ frame can be used for scanning and all other frames for displaying the actually desired projection. To this end, the camera(s) and the projection unit have to be connected with each other via a trigger signal (also referred to as Sync signal) (not explicitly shown in FIGS. 1a and 1b).

The same types of measurement may in principle be used (depending on the availability and the need) in both phases (initialization and optimization):

2D texture features (such as so-called SIFT features, SURF features, FAST corners or further feature descriptors used in image processing) of the workpiece automatically extracted from the camera images using image processing. In case of a stereo photogrammetric system, the latter can automatically be further processed to 3D features by triangulation;

2D edge features of the workpiece automatically extracted from the camera images by image processing. In case of a stereo photogrammetric system, the latter can automatically be further processed to 3D features by triangulation;

3D point cloud adapted to be automatically acquired from a depth camera (time of flight camera) or any other depth sensor;

3D point cloud adapted to be automatically acquired from scanning (cf. above);

2D features in the camera image that can be acquired semi-automatically (3D in the case of a stereo photogrammetric system). The worker selects striking points in the camera image which have been selected previously by the image processing due to specific criteria;

2D features that can be acquired semi-automatically by the placement of markers onto the workpiece (3D in the case of a stereo photogrammetric system). The worker places markers onto the workpiece which are then automatically detected by the system;

2D features that can be acquired semi-automatically by the projection of crosshairs (or equivalent projection) onto specific places of the workpiece. The worker displaces a projected crosshair by use of control/remote control until it coincides with a predefined point on the workpiece.

Ideally, the initialization is now realized with the aid of features which can be acquired automatically. It is possible to scan very quickly (since over the entire surface) by using a video projector. Many features are available quickly and over the entire surface also if a depth camera is available. In case the structure of the workpiece is "good-natured" (not too many and not too little contours, no symmetries), an automatic initialization can be successful by a comparison with the computer model (model-based approach). This even applies in a reduced form with the aid of a pure image processing, for which the object must however be of a type which is even more "good-natured".

A fully automatic initialization can however fail for insufficient good nature of the workpiece or due to the time expenditure such as in case of the use of a laser projection unit which is only adapted to project points or lines. In this case, a number as small as possible of additional, semi-automatically acquired features can be employed. Markers are then fixed in specific places on the workpiece for referencing, for example.

In a particularly advantageous development of the method, the repeated semi-automatic fixing of markers can be avoided in that a transport or support device firmly connected with the workpiece at the time at which the described method is applied is used for initialization. Workpieces are for example often moved clamped in frames or on trolleys and are temporarily connected to this device via precisely defined receiving points such that the spatial relationship between the workpiece and the transport or support device is specified at least reasonably precisely. In case the markers are now directly fixed to the reusable transport or support device, the desired direct relationship between the projection system and workpiece can be established automatically via the relationship between the projection system and the transport or support device and between the transport or support device and the workpiece.

If the transport or support device is manufactured in an accurate and sufficiently torsion-resistant manner, the optimization phase (described below) may possibly even be omitted.

The optimization of the pose can be carried out after having performed the initialization. In case the object has already been sensed in extensively by scanning or by a depth camera during initialization, it may possibly be sufficient to reuse these data. Otherwise, it is now very simple to acquire further data as the approximate pose is already known. The association of further 2D/3D features from the image processing to corresponding places in the computer model is considerably simplified since the search area is now much smaller. Using a laser projector, it is now also possible to purposefully and thus quickly perform a scanning in specific places. The acquisition of further semi-automatic features is now also simpler. Since the pose is approximately known, supporting information can already be projected onto the object approximately in the correct place. It is therefore possible to simply indicate to the worker, for example, in which bores further markers are to be placed, if necessary.

In this way, so much information is at first collected as is necessary for the final calculation of the pose with the required accuracy. Like in initialization, it is relied on automatic methods, as far as possible and useful, semi-automated methods being additionally used if this is necessary. The matching now follows, i.e. the best possible alignment (floating into position) of the 2D/3D features with the computer model (CAD model, polygon model (Mesh) or similar) stored in the computer. An iterative best-fit strategy is here pursued. A pose of the point cloud to the computer model is implicitly calculated. Since the 3D positions of the point clouds in the projection system are simultaneously also known, a direct spatial relationship between the computer model or the point cloud and the projection system can thus be established.

For the optimization of the pose by use of an iterative best-fit strategy, the following techniques are in particular considered:

Reference point system (RPS): the calibration is primarily carried out merely via specific control points on the workpiece which are considered as particularly precisely known due to the manufacturing process in the respective manufacturing step and which are therefore seen as reference. These areas are purposefully detected in the form of 2D/3D features using one of the methods described above. According to the so-called 3-2-1 rule, a primary, a secondary and a tertiary plane are defined, the primary plane being defined by three points, the secondary plane by two points and the tertiary plane by one point. Ideally, the generated faces should be perpendicular to each other. This technique is established in car manufacturing, the RPS points being necessary for the later assembly of supplied parts or single parts. Instead of points, elongated holes or faces are used. The result of the optimization is a heterogeneous three-dimensional point cloud with accumulations at the relevant reference positions which was iteratively positioned/aligned until the sum of the square distances from the computer model became minimum. Constructional tolerances are thus kept low locally, i.e. relative to the used reference relationships, and are best possibly distributed thereto. The strategy to generate tolerances that are as small as possible and to distribute them locally and with respect to the reference relationships present in the closer environment is in particular very appropriate if the accuracy of the positioning of add-on parts relative to these relationships is required, for example because an add-on part has to be precisely inserted between two already mounted add-on parts and the global relationship is not really relevant. This procedure is equivalent to the use of templates which have a so-called "stop geometry" permitting the worker to place the template unambiguously on the workpiece locally and relative to the already existing points, planes or edges.

global best fit: the workpiece is scanned and is sensed extensively with high density in the form of 2D/3D features (video projector), or at least a large number of 3D points is sensed on the surface of the workpiece (laser projector). In both cases, the total number of corresponding points (markers+scan points) is considerably increased. The result of the optimization is the pose of an approximately uniformly distributed three-dimensional point cloud which has been positioned/aligned iteratively until the sum of the square distances from the computer model became minimal. Here, the constructional tolerances are thus also kept low and possibly global, i.e. distributed in the area of the scanned point cloud. The strategy to generate tolerances which are as small as possible and to distribute them globally as uniformly as possible is particularly practical if the workpiece to be manufactured is per se completed and/or no higher context exists anymore (example: CNC milled part having a constant accuracy development distributed over the surface and to which add-on parts are to be mounted).

A simplification for the worker in the placement of the markers can be obtained by a so-called "seat-bucket alignment" in which the association of the 3D points detected upon calibration with the corresponding features in the computer model is realized automatically. To this end, possible plugging positions for the markers or the adapters thereof in the computer model are previously determined algorithmically (i.e. automatically). The manual association of features in the computer model with the corresponding markers is then completely omitted in the ideal case. For this kind of association, it is possible to use uncoded markers which are placed in any existing bores onto the workpiece without taking the order into consideration and without having to observe a 1-to-1 association with previously determined bores. The preparatory time is therefore reduced since the planning of referencing in the computer model is simplified. Furthermore, the setup time of the system is reduced since a false positioning is no longer possible and it is no longer necessary to take marker IDs into consideration. Such uncoded markers occupy a smaller area due the lack of code information and can thus be constructed and manufactured to be considerably easier to handle.

To make referencing more robust and faster, it is possible to fall back on a "sensor fusion" under the corresponding conditions, as is explained below. There are different optical features which are potentially available for referencing. These include texture features and specific geometry features such as straight or curved edges, corners and surfaces which can be individually detected by the photogrammetric device at first in 2D in each camera image and which can directly be further processed to 3D features by triangulation in the case of a stereo camera system. It is furthermore possible to detect geometry features such as edges, corners and surfaces directly in 3D, for example using a time-of-flight camera, a projector photogrammetric system (scanning) or a projector stereo camera system (scanning). The markers mentioned above, such as circle markers of the conventional metrology, may be sensed by 2D measurements in a camera image or 3D measurements, for example using a stereo camera system. Due to the convenient fusion of these features, if present, the following can be obtained:

- less or no markers at all are required for referencing by the assisting effect of other features;
- less markers are required with the same accuracy, for example because planes must no longer be metrologically precisely marked via 3 markers, but initially only using approximately 1 marker. Analogously, the accuracy increases with the same number of markers;
- an ad hoc training of marker-free tracking methods on a photogrammetrically measured reference object without the necessity of CAD data is possible;
- the scanning expenditure is minimized by a previous filtration in the image processing. The initial pose (initialization) can thus be obtained more easily. The areas in which the image processing provides reliable results (on the basis of 2D features or of triangulated 3D features) must no longer be scanned. This is particularly advantageous if a laser projector is used since the extensive scanning by use of a laser is relatively time-consuming.

The meaning of sensor fusion is to be further explained with reference to the following considerations. Usually, a workpiece can be referenced unambiguously and precisely via three 3D point markers which are well distributed in the visual range of the camera(s). Three is thus the mathematical minimum number of markers for solving the problem. A wide distribution of the markers is necessary because of the required accuracy. It is a metrological basic principle to distribute the references well over the entire measuring area. Though a single square marker the position and location to the workpiece of which is known makes more than the mathematical minimum of information available via its 4 corner points, at least three visible square markers are required due to the mentioned distribution principle. In case no unambiguously identifiable points are available, it is possible to manage with the marking of planes. Three known planes also unambiguously define the position and location of the workpiece in space (points and planes are mathematically dual with respect to each other). Three points are required to unambiguously identify a plane. Three planes marked in this way (thus a total of nine markers) on the workpiece are thus also possible. Alternatively, it is possible to use six points on three planes according to the RPS system to unambiguously determine the position and location. Different combinations of geometric point, straight line and plane features may generally be used to unambiguously and precisely determine the position and location of a workpiece:

- six points on three planes (RPS system), i.e. six placements of plane adapters,
- two straight lines (or alternatively two larger circles), i.e. four placements of edge adapters,
- one axis and one point correspondence, i.e. three placements, one point/two edge adapters,
- three points (or alternatively three planes), i.e. three point adapters or nine plane adapters,
- two planes and one point (or alternatively 1 plane and 2 points), i.e. six plane adapters and one point adapter (or selectively three plane and two point adapters).

If the measures described above are now used to optimize the pose, the use of markers can be restricted to the initialization. The requirements as to accuracy is eliminated, merely the robustness is still required. It can thus be initialized via less markers, for example:

- a planar marker (or a so-called "virtual gauge" such as a steel square for toolmakers with markers arranged thereon), roughly shifted into a corner. The optimization is then performed via the detection of the edges in the camera image or in the scanned point cloud, for example.
- three plane adapters for marking three planes. The optimization is for example carried out by projection and 3D reconstruction of large circles about the plane adapters. In other words: each of the three planes is at first roughly reconstructed via the small circle mark (high angler error due to a small radius), and is then stabilized by a large circle. This is appropriate for a laser projector, because it is possible to scan very purposefully.
- alternative: extensive scanning operation and reconstruction of all planes in the point cloud, particular suitable for video projection.

It is in any case also possible to purposefully scan after the six RPS records.

As a result, the minimum number of the marker adapters can be reduced from three to nine up to now, to one to three. In an extreme case, it is possible to completely dispense with markers if

- an extensive scanning is possible and the geometry reconstructed from the point cloud can unambiguously be associated with the component with the aid of a model-based marker-free approach (no symmetries, no repetitions);
- the model-based tracking approach alone functions in a robust manner also without scanning (no symmetries, no repetitions, furthermore even stronger requirements as to the clarity of the geometry, i.e. not too much and not too little texture features or geometry features on the surface and favorable illumination conditions);
- the initialization is ensured by 1) projection of an outline (or also markers such as crosshairs on striking points etc.) and thus 2) instructed manual placement of the projector such that the projected outline approximately coincides with the physical workpiece.

The combination of scanning, marker free methods of image processing and depth cameras or depth sensors increase so to speak the robustness.

Irrespective of the measuring method used, according to a particular aspect, it is provided upon matching that merely a portion of the surface of the workpiece which is considered as reliable is taken into account. Such a portion preferably includes reference points (RPS system) or other significant features of the workpiece which are considered to be particularly precisely known or accurately manufactured. The portion need not comprise the area of the workpiece which is to be processed. Depending on the situation, a floating into position on an area still to be modified could even be counterproductive. The section can of course be composed of more than one continuous section of the surface.

After the successful referencing, the control unit checks using the pose of the projector as determined by referencing whether an area of the workpiece in which the processing is to be carried out (hereinafter referred to as mounting position for reasons of simplicity) is visible (i.e. is not covered by other parts of the workpiece) and can be submitted to a projection within a predetermined angular area (as perpendicularly as possible). It is particularly helpful to perform this check (as shown in FIG. 2) directly after initialization to be able, if necessary, to display a piece of information for the correction of the positioning of the projector or of the workpiece as quickly as possible and in an interactive manner for the worker. Alternatively, this step is also conceivable after optimization of the pose.

Further, in a particularly advantageous development of the method, the workpiece is again scanned in the area of the mounting position after having performed the optimization of the pose and the check of the correctness of the pose of the projector. Depending on the projector type, the surface of the workpiece there is sensed with structured light or a laser beam, with the reflected light from the photogrammetric device being detected. A three-dimensional actual point cloud is established from the measuring results by triangulation, and an actual surface model (polygon mesh) of the workpiece in the area of the mounting position is calculated.

On the basis of this surface model, it is at first possible by a comparison with the target state (computer model) of the add-on part to be mounted (here the support to be mounted) to check in an optional processing step whether the add-on part has already been mounted in a correct manner previously—consciously or unconsciously. This is particularly appropriate anywhere revision status of the constructional data often change and "old" workpieces have therefore to be brought to an actual revision status, such as in the early phase of product development, in particular in the construction of prototypes. The same applies if the processing step provides the removal of material and it has been detected by scanning that no further removal is required. In these cases, the control unit outputs a notice that the processing step initially provided in this place is no longer required such that the next processing step can be started.

In case the check of the necessity of the processing step has led to a positive result or in case such a check is not provided at all, a work instruction (a specific piece of information related with the processing step) is now projected onto the workpiece to be processed to assist the worker which has to perform the processing step.

It must be emphasized here that prior to the actual projection the work instruction is adapted to the detected actual state of the workpiece, i.e. the mounting position to be projected (the outline) is automatically converted into the actual surface of the workpiece. This is to be explained with reference to the example scenario below.

In locomotive building, the projection system is calibrated with respect to the locomotive via reliable bores, edges or planes (hereinafter referred to as control points) on the underbody. The selected control points correspond in a sufficiently accurate manner to the computer model, i.e. the position of the sheet metal part is per se correct. However, larger deviations from the computer model appear between the reliable control points. If the projector now has to project the position of a support to be mounted onto the metal sheet and the metal sheet is more or less far away from the projector than is suggested by the computer model due to tolerances in the joining technique in the support position to be projected, the projection surface then does not correspond to the planned state. This is usually unproblematic as long as it is projected exactly perpendicularly onto the metal sheet since in this case, the desired support position (2D coordinates on the surface) is still met. However, in case the projection is effected at an angle (obliquely) onto the metal sheet, the projection is shifted with respect to the desired position. The reason for the deviation from the planned target is often the so-called "welding distortion". An initially planar metal sheet is locally deformed by welding operations (thermal influence) and is in particular bent or undulated. It is currently not possible to completely eliminate this effect at reasonable expense. Due to the scanning of the workpiece, the deviation is however detected immediately before the realization of the mounting step and the projection can be adapted perpendicularly to the actual position by a conversion of the target position of the support to be mounted such that the work instruction is projected in the correct position. This measure prevents possible errors in the processing of the workpiece or avoids a confusion of the worker due to an incorrect projection.

As a further specialty, it is checked during the projection by scanning whether the projection of the work instruction actually meets the desired surface or whether a masking is present. The reason for a masking may, for example, consist in that the computer model of the workpiece is present in an incomplete manner and a disturbing part is therefore not programmatically recognized already before the projection. A masking is suggested if the expected light points of the projection appear in another place in the recorded image of the photogrammetric device or are not recognizable at all. The control unit can then ask the worker to reposition the projector.

In case all requirements for a projection in the correct position are fulfilled, the worker can perform the processing step, here the welding of a support. The worker then manually confirms the control unit the realized execution, or the system automatically recognizes the execution within the framework of monitoring which is anyway carried out and is described below.

The processing step is monitored by the device within the framework of a target-actual comparison. To this end, the workpiece is again scanned in the same manner as above, preferably again merely in the area of the mounting position or generally in all areas in which changes have been made to the workpiece within the framework of the processing step. The resulting three-dimensional point cloud is compared with the data from the computer model representing the target state after the processing step.

Within the framework of the evaluation by the control unit, it is derived from the deviations between the target and the actual state according to an algorithm adapted to the concrete processing step whether the processing step has been performed completely and correctly or not. According to the example embodiment, it is thus immediately recognized whether the support has actually been placed in the right place with the correct orientation.

In case after the processing the workpiece corresponds to the quality criteria as determined by the control unit, this is automatically communicated to the worker, and a documentation of the successfully performed processing step is carried out, preferably including an evidence, for example in the form of a log file, photographs or similar.

However, in case deviations of the actual state from the target state are detected which are so large that a quality defect or a processing error is to be assumed, the comparison is assessed as defective, and a warning notice is immediately output. The notice can merely consist in an (acoustic and/or optical) warning. It is however also possible to project and/or to (alternatively or additionally) output a more detailed error notification or error description on a different output device, such as the screen of the control unit or the tablet PC. In case the processing step for example provided for a removal of material (grinding etc.), the deviation from the target state, in particular a still existing protrusion can be marked by the device.

Usually, the worker then performs a post-processing or a correction and confirms the control the completion thereof. The target-actual comparison is then again carried out as described above.

In addition to the results described above "successfully checked" and "defective", the algorithm can provide further results, such as "unknown", "not yet mounted" and/or "not yet checked".

The worker thus in any case immediately receives a feedback as to the success or the quality of the just performed processing.

In case of a larger variant diversity, for example in case of a plurality of different support types in aircraft construction, a correct detection of the right support type by scanning may possibly not be ensured without difficulty. The method however provides at least the realization of a plausibility check in which the scanned point cloud is compared with the geometry to be expected after processing.

In a particularly advantageous embodiment of the method, the correct realization of the processing step (or, if necessary, at least the correct positioning of an add-on art) is continuously checked by the device. This is particularly practical if the shown projection is interlaced with the representation required for the scanning so closely in time that the perception of the worker is not influenced or only slightly influenced by the automatic detection of the correct execution realized via scanning. The outline/resting surface of a support may thus initially be displayed in red and be switched to green as soon as the support has been placed correctly. In case of an unintended slipping, the projection would again be switched to red. The worker thus receives a direct feedback already during the performance rather than only afterwards. In the concrete example, the support may thus be placed correctly before the final fixing by spot-welding or other joining techniques is actually carried out.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of performing and monitoring a processing step on a workpiece using a system having a projector, a photogrammetric device and a control unit knowing a relative position of the projector and the photogrammetric device, the method comprising the following steps:
referencing, to determine a pose of the workpiece with respect to the projector and the photogrammetric device in a predetermined coordinate system,
projection of a work instruction onto the workpiece,
processing of the workpiece by a worker, and
monitoring of the processing by scanning at least a portion of a surface of the workpiece, wherein all steps, with the exception of the processing by the worker, are performed by the system and wherein all steps are performed at the same workstation within a framework of an integrated process.

2. The method according to claim 1, wherein the processing step to be currently performed and to be monitored or a processing step sequence is selected in the control unit in that in a preceding process step prior to referencing, at least one encoded marker is attached directly to the workpiece or to a fixture of the workpiece and is automatically sensed and evaluated by the photogrammetric device, the evaluation preferably including an identification of the workpiece, and the processing step(s) being selected on the basis of the evaluation.

3. The method according to claim 1, wherein within the framework of referencing, the system performs an initialization and then an optimization, the initialization and/or optimization including a scanning of at least a portion of the surface of the workpiece.

4. The method according to claim 3, wherein within the framework of referencing, merely a portion of the surface of the workpiece considered as reliable is scanned, the portion containing reference points or other significant features of the workpiece which are considered as particularly exactly known or precisely manufactured and can present more than one continuous section of the surface.

5. The method according to claim 3, wherein the projecting of a representation required for the scanning within the framework of a dynamic referencing and/or of a continuous monitoring of processing is interlaced with the projection of the work instruction.

6. The method according to claim 3, wherein upon initialization and/or optimization, at least one of the following measurement types is used: 2D texture and/or 2D edge features extracted automatically or semi-automatically from records of the photogrammetric device by image processing, further processed to 3D features, if required; 3D point cloud adapted to be automatically acquired from a depth camera or by scanning; 2D features that are adapted to be automatically or semi-automatically acquired by the detection of markers on a transport or support device of the workpiece or on the workpiece itself, further processed to 3D features, if required; 2D features adapted to be semi-automatically acquired by placing markers on the workpiece and/or by projecting markers such as crosshairs onto specific places of the workpiece, further processed to 3D features, if required.

7. The method according to claim 3, wherein a transport or support device firmly connected to the workpiece is used for initialization, markers being fixed to the transport or support device and being sensed by the photogrammetric device, the relationship between the projector and the workpiece required for referencing being thereby automatically established via the relationship between the projector and the transport or support device and the transport or support device and the workpiece.

8. The method according to claim 3, wherein after initialization, the worker receives instructions where additional markers have to be placed on the workpiece to support the optimization.

9. The method according to claim 3, wherein within the framework of optimization, an iterative best-fit strategy is pursued, a pose of a point cloud with respect to a computer model of the workpiece available to the control unit being determined from the known 3D positions of the point cloud of the surface of the workpiece detected by scanning.

10. The method according to claim 3, wherein within the framework of optimization, an iterative best-fit strategy is pursued after the detection of predetermined control points of a reference point system and/or after an extensive scanning with high density or sensing of a plurality of 3D points on the surface of the workpiece.

11. The method according to claim 3, wherein the scanning is preceded by placement and sensing of uncoded markers on the workpiece and/or on a transport or support device of the workpiece, possible placing positions in a computer model of the workpiece or of the transport or support device of the workpiece being previously determined.

12. The method according to claim 1, wherein for referencing, a plurality of optical features, in particular of different optical features is detected using different measuring techniques, a preliminary filtration being preferably carried out in treatment of the images captured by the photogrammetric device.

13. The method according to claim 1, wherein using the pose of the projection as determined from referencing, in particular already from the initialization thereof, the control unit checks whether a surface area of the workpiece in which the processing is to be performed by the worker is located uncovered in a projecting area of the projector.

14. The method according to claim 1, wherein after referencing and before the projection of the work instruction, a surface area of the workpiece in which the processing is to be performed by the worker is again scanned, the surface area being preferably sensed with structured light or a laser beam, with reflected light being detected by the photogrammetric device, a three-dimensional actual point cloud being established by triangulation from the measuring results, and an actual surface model of the workpiece in the processing area being calculated.

15. The method according to claim 14, wherein a check whether the processing step has already been carried out correctly is carried out on the basis of the actual surface model by a comparison with a target state, in particular with a computer model.

16. The method according to claim 15, wherein in case of a deviation of the actual surface model from the target state, the projection of the work instruction is adapted to the actual surface model of the workpiece by conversion such that the work instruction is projected in the correct position.

17. The method according to claim 1, wherein during the projection of the work instruction, it is checked by scanning whether the projection of the work instruction onto a surface area of the workpiece in which the processing is to be carried out by the worker is actually received or is masked, wherein a masking is assumed if the expected light points of the projection appear in an unexpected place in a recorded image of the photogrammetric device or are not detectable at all, and wherein the control unit preferably requests the worker to perform a repositioning of the projector or of the workpiece in case of a masking.

18. The method according to claim 1, wherein within the framework of the monitoring of the processing, the surface area of the workpiece in which the processing is to be carried out by the worker is purposefully scanned and in that a comparison with a target state, in particular a computer model, is performed merely on the basis of the three-dimensional actual point cloud thus obtained.

19. The method according to claim 1, wherein the monitoring of the processing is performed continuously, in particular also before a confirmation of the end of the processing by the worker, the projecting of the work instruction being preferably interlaced with the projecting of a representation required for scanning, and/or a feedback being preferably immediately output to the worker already during processing depending on the respective result of the continuously performed monitoring.

20. The method according to claim 1, wherein a result of the monitoring is documented, in particular by a log file and/or a photo.

21. The method according to claim 1, wherein the processing of the workpiece by the worker includes modifying an outer shape of the workpiece.

22. The method according to claim 21, wherein modifying the outer shape of the workpiece includes at least one of the following: a mounting, joining, welding, or fastening of a component to the workpiece, and/or machining or grinding the workpiece to achieve a material removal from the workpiece.

* * * * *